US008493209B2

(12) United States Patent
Mohan et al.

(10) Patent No.: US 8,493,209 B2
(45) Date of Patent: Jul. 23, 2013

(54) DISTRIBUTED LIGHTING CONTROL OF A CORRIDOR OR OPEN AREAS

(75) Inventors: Tanuj Mohan, Mountain View, CA (US); Premal Ashar, Mountain View, CA (US)

(73) Assignee: enLighted, Inc., Sunnyvale, CA (US)

( * ) Notice: Subject to any disclaimer, the term of this patent is extended or adjusted under 35 U.S.C. 154(b) by 190 days.

(21) Appl. No.: 12/878,157

(22) Filed: Sep. 9, 2010

(65) Prior Publication Data

US 2012/0062125 A1    Mar. 15, 2012

(51) Int. Cl.
*G08B 1/08* (2006.01)
*G05F 1/00* (2006.01)

(52) U.S. Cl.
USPC ............. 340/539.3; 340/539.26; 340/541; 340/693.3; 315/291; 315/307; 315/312; 315/158

(58) Field of Classification Search
USPC ............. 315/246, 247, 219, 209 R, 274–289, 315/291, 307–326; 340/539.3, 539.26, 541; 340/693.3, 693.4
See application file for complete search history.

(56) References Cited

U.S. PATENT DOCUMENTS

| | | | |
|---|---|---|---|
| 5,101,141 A | 3/1992 | Warner et al. |
| 5,179,324 A | 1/1993 | Audbert |
| 5,191,265 A | 3/1993 | D'Aleo et al. |
| 5,283,516 A | 2/1994 | Lohoff |
| 5,812,422 A | 9/1998 | Lyons |
| 6,057,654 A | 5/2000 | Cousy et al. |
| 6,188,181 B1 | 2/2001 | Sinha et al. |
| 6,342,994 B1 | 1/2002 | Cousy et al. |
| 6,548,967 B1 | 4/2003 | Dowling et al. |
| 7,309,985 B2 | 12/2007 | Eggers et al. |
| 7,348,736 B2 | 3/2008 | Piepgras et al. |
| 7,382,271 B2 | 6/2008 | McFarland |
| 7,437,596 B2 | 10/2008 | McFarland |
| 7,550,931 B2 | 6/2009 | Lys et al. |
| 7,566,137 B2 | 7/2009 | Veskovic |
| 7,792,956 B2 | 9/2010 | Choong et al. |
| 7,925,384 B2 | 4/2011 | Huizenga et al. |
| 2004/0002792 A1 | 1/2004 | Hoffknecht |
| 2005/0169643 A1 | 8/2005 | Franklin et al. |
| 2005/0231112 A1 | 10/2005 | Woo et al. |
| 2006/0275040 A1 | 12/2006 | Franklin |
| 2007/0057807 A1 | 3/2007 | Walters et al. |
| 2007/0061050 A1 | 3/2007 | Hoffknecht |
| 2007/0086128 A1 | 4/2007 | Lane et al. |
| 2007/0215794 A1 | 9/2007 | Cernasov et al. |
| 2008/0185977 A1 | 8/2008 | Veskovic et al. |
| 2008/0244104 A1 | 10/2008 | Clemente |
| 2009/0026966 A1 | 1/2009 | Budde et al. |
| 2009/0179596 A1 | 7/2009 | Willaert et al. |
| 2009/0195161 A1 | 8/2009 | Lane et al. |
| 2010/0034386 A1 | 2/2010 | Choong et al. |
| 2010/0135186 A1 | 6/2010 | Choong et al. |
| 2010/0264846 A1 | 10/2010 | Chemel et al. |
| 2010/0270933 A1 | 10/2010 | Chemel et al. |
| 2010/0295482 A1 | 11/2010 | Chemel et al. |
| 2010/0301777 A1 | 12/2010 | Kraemer |
| 2011/0031897 A1 | 2/2011 | Henig et al. |

*Primary Examiner* — Tuyet Thi Vo
(74) *Attorney, Agent, or Firm* — Brian R. Short

(57) ABSTRACT

Methods and apparatuses of distributed lighting control are disclosed. One method includes a sensor sensing a change of light intensity per unit of time greater than a sense threshold. If a light associated with the sensor is within a corridor and the sensed change of light intensity per unit of time is greater than the sense threshold, then the light is activated at a preselected corridor light intensity. If the light associated with the sensor is not within a corridor and the sensed change of light per unit of time is greater than the sense threshold, then the light is activated at a preselected non-corridor light intensity. For an embodiment, the preselected corridor light intensity is greater than the preselected non-corridor light intensity.

10 Claims, 6 Drawing Sheets

DISTRIBUTED LIGHTING CONTROL OF A CORRIDOR OR OPEN AREAS

FIELD OF THE EMBODIMENTS

The described embodiments relate generally to lighting. More particularly, the described embodiments relate to methods and systems for distributed lighting control.

BACKGROUND

Lighting control can be used to automatically control lighting under certain conditions, thereby conserving power. However, lighting control, specifically advanced lighting controls have not been widely adopted in the general commercial market because the installation, setup related costs and complexity have made these lighting systems prohibitively expensive for most commercial customers. Additionally, if these systems include intelligence, they are centrally controlled. Central control is not as flexible.

Today, most switches and sensors are hard-wired to operate a given set of lighting fixtures. This is a reliable and robust mechanism of turning on a set of light fixtures achieving a desired result, such as turning on the lights of a corridor. To achieve the same effect without hard-wiring most advanced lighting control fixtures of today must rely on some form of network communication. Network communication can be susceptible to interference and it can be a relatively complex task to manually configure the desired effect through a user interface.

It is desirable to have a lighting method, system and apparatus for intelligent control of distributed lighting that is not susceptible to the problems of network communications.

SUMMARY

One embodiment includes a method of distributed lighting control. The method includes a sensor sensing a change of light intensity per unit of time greater than a sense threshold. If a light associated with the sensor is within a corridor and the sensed change of light intensity per unit of time is greater than the sense threshold, then the light is activated at a preselected corridor light intensity. If the light associated with the sensor is not within a corridor and the sensed change of light per unit of time is greater than the sense threshold, then the light is activated at a preselected non-corridor light intensity.

Another embodiment includes activating the light at a preselected corridor light intensity if a light associated with the sensor is within a corridor and the sensed change of light intensity per unit of time is greater than the sense threshold, and if within a predetermined amount of time before the sensor sensing a change of light intensity per unit of time greater than a sense threshold, a level light intensity sensed by the sensor is below an initial threshold.

Another embodiment includes a system for distributed lighting control. The system includes a light, means for the determining if the light is within a corridor, and a sensor associated with the light for sensing a change of light intensity per unit of time greater than a sense threshold. A controller is associated with the light and the sensor. The controller is operative to activate the light at a preselected corridor light intensity if a light associated with the sensor is within a corridor and the sensed change of light intensity per unit of time is greater than the sense threshold, and the controller is operative to activate the light at a preselected non-corridor light intensity if the light associated with the sensor is not within a corridor and the sensed change of light per unit of time is greater than the sense threshold.

Other aspects and advantages of the described embodiments will become apparent from the following detailed description, taken in conjunction with the accompanying drawings, illustrating by way of example the principles of the described embodiments.

DETAILED DESCRIPTION

The described embodiments are embodied in an apparatus and method for distributed lighting control. The distributed control provides for distributed, intelligent light control that does not require a central controller. Additionally, no physical wiring for control signals between lights and/or light controllers is required. Essentially, the distributed lighting control creates an envelope of light that propagate along corridors, but attenuates along non-corridors. The intelligence of the distributed light control reduces energy required to power the lights.

Figure 1:
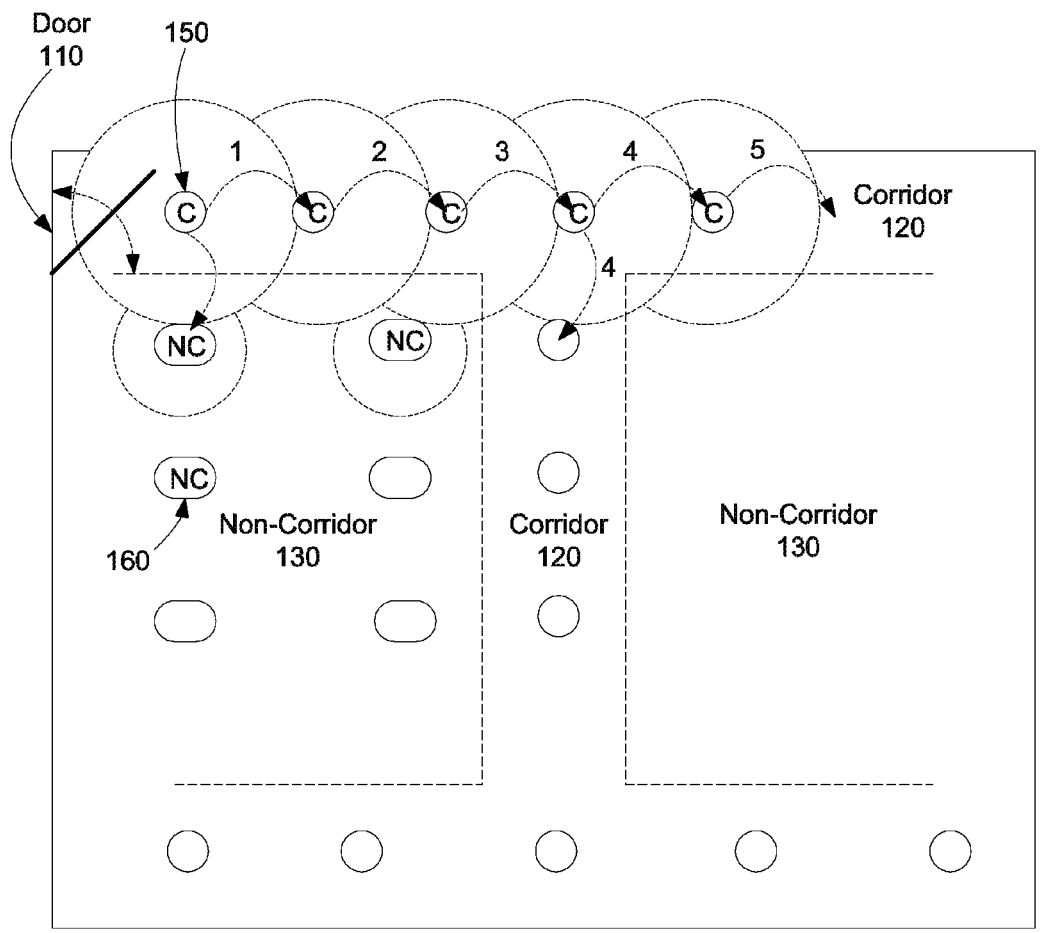
FIG. 1 shows an example of distributed lighting control within a corridor, and outside of the corridor.

FIG. 1 shows an example of distributed lighting control within a corridor, and outside of the corridor. FIG. 1 shows an exemplary floor located, for example, within a business. The floor includes areas designated as corridors 120, and non-corridors 130. A corridor 120 is, for example, an area of the floor that get a large amount of foot traffic, such as, a hallway or a stairwell. The non-corridor areas include, for example, cubicles locate within the floor. Due to the large amount of foot traffic typically experienced by corridors 120, the lighting of the corridors can reasonably be treated differently than non-corridors. Embodiments of the control of both the corridor and non-corridor lights are directed to reducing power use.

As shown, a first corridor light 150 is triggered by an event. For example, a motion sensor may detect that a door 110 is opened. If the corridor light 150 was previously deactivated, the corridor light 150 then turns on with a light intensity near full capacity of the light because an occupant has been detected.

Once the corridor light 150 "turns on" with a light intensity greater than a threshold, the neighboring lights (through light sensors) sense the light emitted by the corridor light 150. The neighboring lights that are corridor lights (designated as (C)) and the neighboring lights that are non-corridor lights (designated (NC)) respond differently. More specifically, for an embodiment, the non-corridor lights respond by emitting light having an intensity corresponding to non-corridor lights that is less than (for example, 50%) the intensity of light emitted by the corridor lights. The result is that the intensity of light emitted from the non-corridor lights does not cause neighboring lights to "trigger" upon reception of light from the non-corridor lights. However, the intensity of light emitted from the corridor lights is great enough to cause neighboring lights to "trigger", and cause the neighboring lights to activate accordingly.

As shown in FIG. 1, because the light intensity of the corridor lights is great enough, the neighboring lights activate. A string (consecutive neighboring) corridor lights activate along corridors, thereby providing an adequate light path for occupant of the room. However, consecutive neighboring non-corridor lights do not propagate light because the light emitted from the non-corridor light is too low.

For embodiments, the previously described "trigger" condition includes sensing light intensity changes of greater than a threshold over a unit of time. The propagation of light along corridors provides a form of wireless communication between the corridor lights without requiring wiring between the lights. This form of wireless communication is not subject to interference and other security related concerns that are part and parcel of wireless communication in the networking world, for example, Zigbee, 802.11 a/b/g/n etc.

Figure 2:
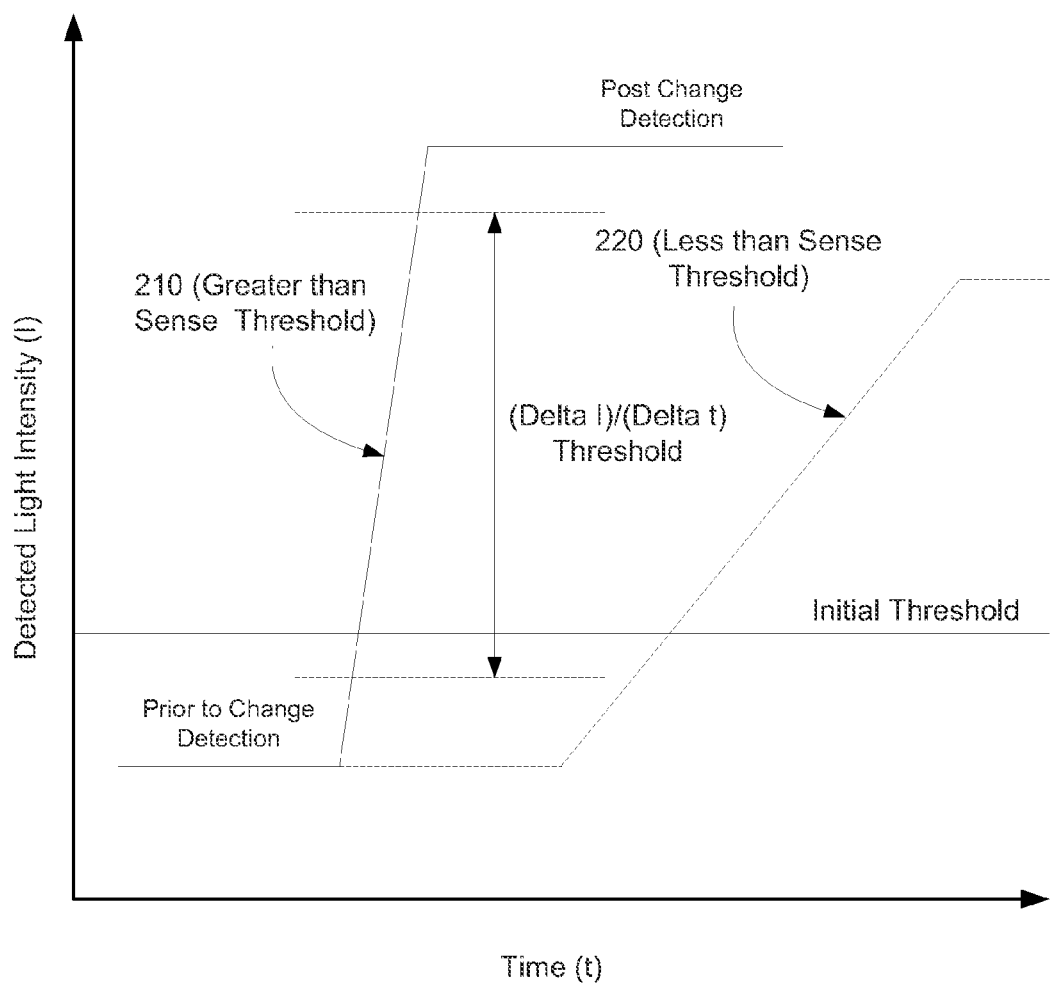
FIG. 2 shows an example of a time line showing the detection a change in light intensity over a time duration exceeding a predetermined threshold.

FIG. 2 shows an example of a time line showing the detection of a change in light intensity over a time duration exceeding a predetermined threshold. Exceeding the predetermined threshold of light over the time duration "triggers" the associated light to activate (turn on).

A first sensed light response 210 includes a sensed light intensity change of greater than the predetermined threshold over a unit of time, and therefore, causes the associated light to activate. Stated another way, activation of the associated light requires detection of a change of light intensity over a period of time, greater than a predetermined threshold. That is, a Delta I (intensity)/Delta t (time) greater than the predetermined threshold. A second sensed light response 220 includes a sensed light intensity change of less than the predetermined threshold over a unit of time, and therefore, does not cause the associated light to active.

An additional requirement can also be included in order for an associated light to active. FIG. 2 shows an initial threshold. For activation of an associated light, an embodiment further includes sensing the light to be below the initial threshold within a selected period of time before sensing the change of light intensity.

Figure 3:
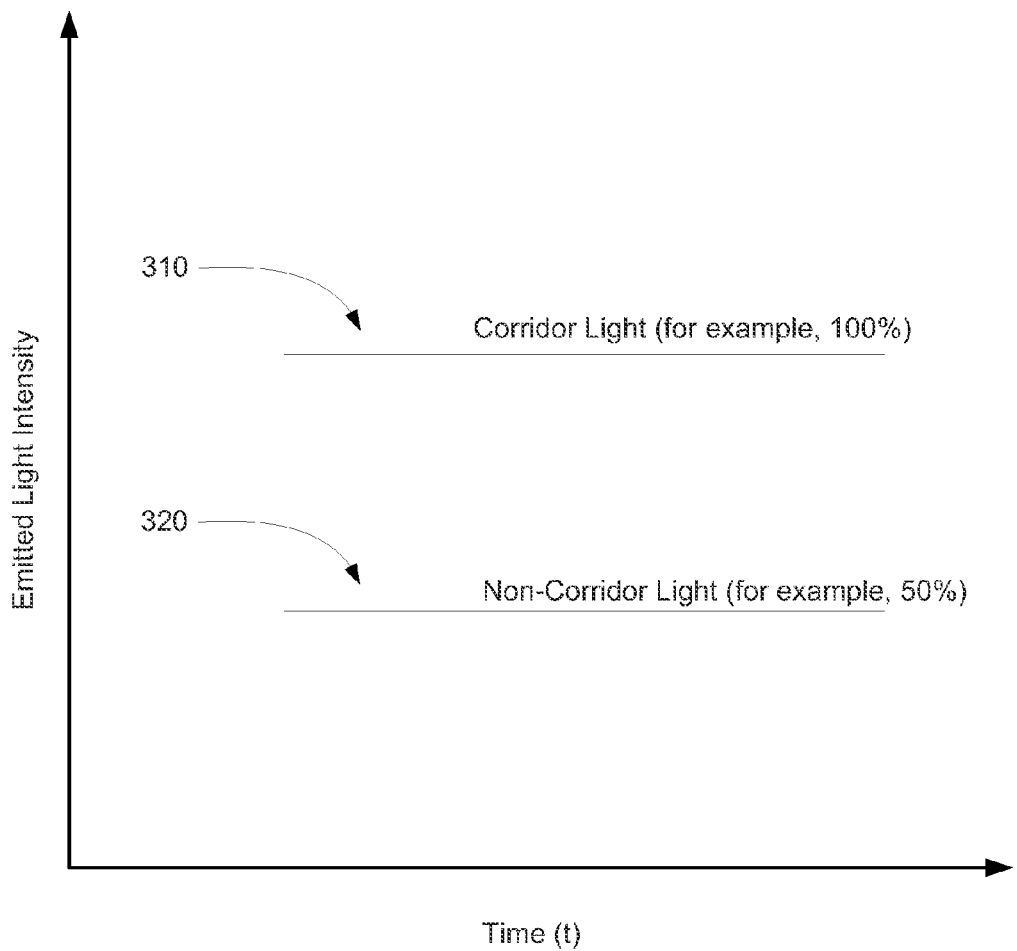
FIG. 3 shows an example of emitted light intensity of a corridor light and for a non-corridor light.

FIG. 3 shows an example of emitted light intensity of a corridor light and for a non-corridor light. As shown, the emitted light intensity of a corridor light when triggered is greater than the emitted light intensity of a non-corridor light when triggered. For a specific example, the light intensity of a corridor light when triggered is approximately 100% of the capability of the light, whereas the light intensity of a non-corridor light when triggered is approximately 50% of the capability of the light. As previously described, the emitted light intensity of corridor lights is great enough to cause a succession of corridor light to be activated along corridors, whereas the emitted light intensity of non-corridor lights is low enough to eliminate propagation of activated light.

Figure 4A:
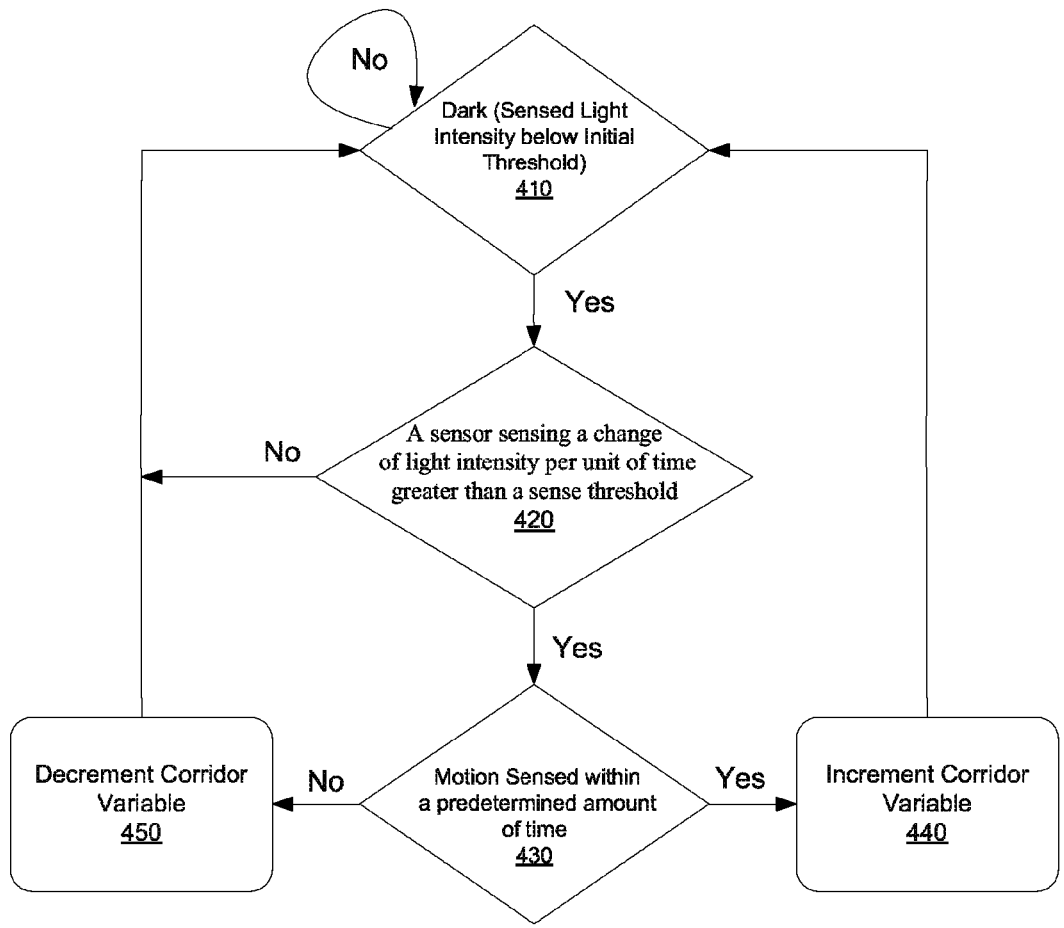
FIGS. 4A and 4B show an example of a discovery process executed by a light to determine whether the light is a corridor light or a non-corridor light.
Figure 4B:
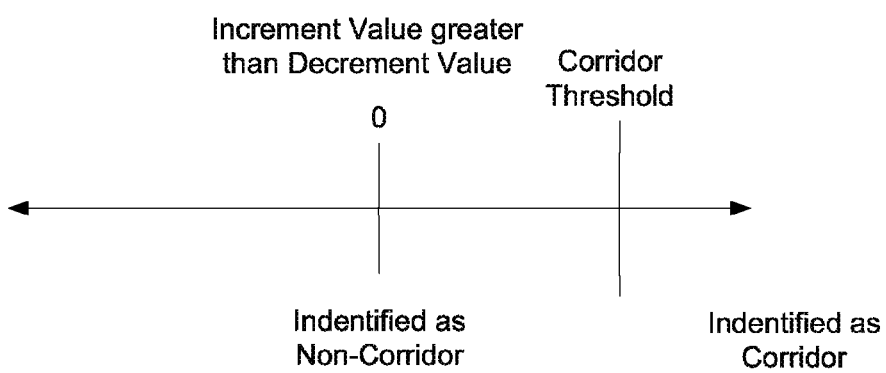

FIGS. 4A and 4B show an example of a discovery process executed by a light to determine whether the light is a corridor light or a non-corridor light. The previously described embodiments include corridor lights responding differently than non-corridor lights. Embodiments further include each light (or a controller associated with each light) performing a discovery operation to determine if the light is a corridor light or a non-corridor light.

FIG. 4A is a flow chart that includes an example of steps of a method of determining whether a light is a corridor light or a non-corridor light. A first step 410 includes determining the sensed light is below an initial threshold. If the sensed light is below the initial threshold, it is assumed that the light is "in the dark". A second step 420 includes sensing a change of light intensity per unit of time greater than a sense threshold. Sensing light greater than the sense threshold suggests that the light is being emitted from a corridor light. A third step 430 includes detecting motion within a predetermine amount of time of detecting the sensed light change of step 420. If conditions of both step 420 and 430 are satisfied, a corridor variable is incremented. If both conditions are not satisfied, the corridor variable is decremented. A step 440 includes incrementing a corridor determination variable. A step 450 includes decrementing the corridor determination variable.

If the corridor determination variable is greater than a predetermined number, then the light is classified as a corridor light. If the corridor determination variable is less than the predetermined number, then the light is classified as a non-corridor light. As described, these embodiments provide an adaptive, real-time process for determining whether or not a light is a corridor light.

For embodiments, the corridor determination variable is incremented a greater amount than the corridor determination variable is decremented. This can be desirable if, for example, persons walking in corridors might have more than 1 way to go (for example, at an intersection)—incrementing the variable by a greater number allows for this.

FIG. 4B shows an example of a value line of the corridor determination variable, suggesting that the variable can adaptively change over time.

Figure 5:
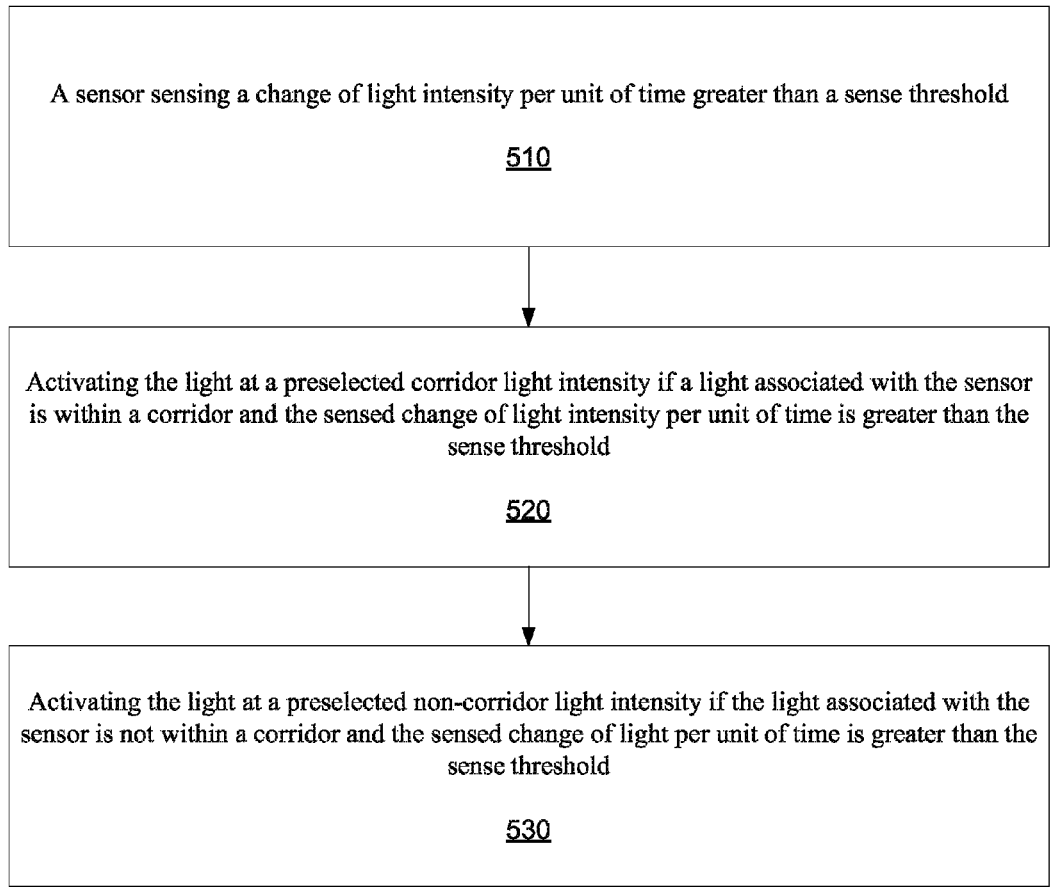
FIG. 5 is a flow chart that includes the steps of an example of a method of distributed lighting control.

FIG. 5 is a flow chart that includes the steps of an example of a method of distributed lighting control. A first step 510 includes a sensor sensing a change of light intensity per unit of time greater than a sense threshold. A second step 520 includes activating the light at a preselected corridor light intensity if a light associated with the sensor is within a corridor and the sensed change of light intensity per unit of time is greater than the sense threshold. A third step 530 includes activating the light at a preselected non-corridor light intensity if the light associated with the sensor is not within a corridor and the sensed change of light per unit of time is greater than the sense threshold. As previously described, embodiments include the preselected corridor light intensity being greater than the preselected non-corridor light intensity.

For an embodiment, the light is activated at the corridor light intensity only if within a predetermined amount of time before the sensor sensing a change of light intensity per unit of time greater than a sense threshold, a level light intensity sensed by the sensor is below an initial threshold.

For an embodiment, if the light is not within a corridor, then the light only activating if motion is additionally detected.

Embodiments include light performing a discovery operation to determine whether the light is a corridor light or a non-corridor light. For an embodiment, the discovery operation includes a controller associated with the sensor tracking the sensor sensing a change of light intensity per unit of time greater than a sense threshold followed by a motion detector associated with the sensor sensing motion within a predetermined amount of time. For a more specific embodiment, tracking includes iteratively incrementing a corridor variable when the sensor senses a change of light intensity per unit of time greater than a sense threshold followed by a motion detector associated with the sensor sensing motion within a predetermined amount of time, iteratively decrementing the corridor variable when the sensor senses a change of light intensity per unit of time greater than a sense threshold which is not followed by a motion detector associated with the sensor sensing motion within the predetermined amount of time, and identifying the light as a corridor light when the corridor variable exceeds a corridor threshold. Embodiments include the corridor variable being incremented with a greater value than then corridor variable is decremented.

Figure 6:
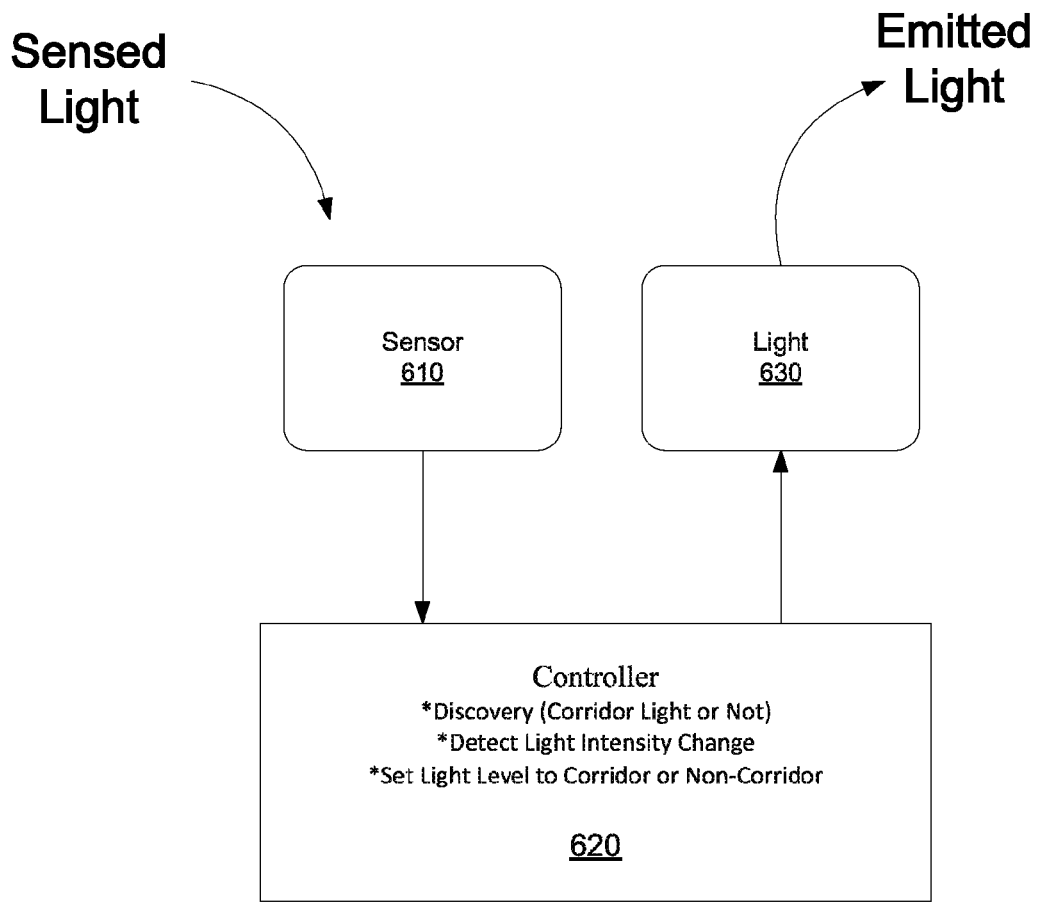
FIG. 6 shows an example of a distributed light control system.

FIG. 6 shows an example of a distributed light control system. The system includes a light 630, a sensor 610 and a controller 620. The sensor 610 provides sensed values of light intensity to the controller 620. The controller 620 controls the light intensity emitted by the light 630. The controller 620 is operative to activate the light 630 at a preselected corridor light intensity if the light 630 is discovered to be within a corridor and the sensed change of light intensity per unit of time is greater than the sense threshold. The controller 620 is operative to activate the light 630 at a preselected non-corridor light intensity if the light associated with the sensor is not within a corridor. The controller 620 determines whether the light 630 is within a corridor or not be executing the previously described discovery process.

The system of FIG. 6 can be a single apparatus that includes the sensor 610, the controller 620 and the light 630. Alternatively, any combination of the sensor 610, the controller 620 and the light 630 can be a single or separate device. Generally, the sensor 610, the controller 620 and the light 630 need to be proximate for proper operation. That is, the sensor 610 should provide an accurate representation of light intensity received by the light 630. The controller 620 could be located anywhere. However, for decentralized control, it can be advantageous to have the controller 620 co-located with the sensor 610 and/or the light 630.

Although specific embodiments have been described and illustrated, the described embodiments are not to be limited to the specific forms or arrangements of parts so described and illustrated. The embodiments are limited only by the appended claims.

What is claimed:

1. A method of distributed lighting control, comprising:
   a sensor sensing a change of light intensity per unit of time greater than a sense threshold;
   if a light associated with the sensor is within a corridor and the sensed change of light intensity per unit of time is greater than the sense threshold, then activating the light at a preselected corridor light intensity;
   if the light associated with the sensor is not within a corridor and the sensed change of light per unit of time is greater than the sense threshold, then activating the light at a preselected non-corridor light intensity.

2. The method of claim 1, wherein the preselected corridor light intensity is greater than the preselected non-corridor light intensity.

3. The method of claim 1, further comprising the light only activating if within a predetermined amount of time before the sensor sensing a change of light intensity per unit of time greater than a sense threshold, a level light intensity sensed by the sensor is below an initial threshold.

4. A method of distributed lighting control, comprising:
   a sensor sensing a change of light intensity per unit of time greater than a sense threshold;
   if a light associated with the sensor is within a corridor and the sensed change of light intensity per unit of time is greater than the sense threshold, and if within a predetermined amount of time before the sensor sensing a change of light intensity per unit of time greater than a sense threshold, a level light intensity sensed by the sensor is below an initial threshold, then activating the light at a preselected corridor light intensity;
   if the light associated with the sensor is not within a corridor and the sensed change of light per unit of time is greater than the sense threshold, then activating the light at a preselected non-corridor light intensity, wherein the preselected corridor light intensity is greater than the preselected non-corridor light intensity.

5. A system for distributed lighting control, comprising:
   a light;
   means for the determining if the light is within a corridor;
   a sensor associated with the light for sensing a change of light intensity per unit of time greater than a sense threshold;
   a controller associated with the light and the sensor, the controller operative to activate the light at a preselected corridor light intensity if a light associated with the sensor is within a corridor and the sensed change of light intensity per unit of time is greater than the sense threshold, and the controller operative to activate the light at a preselected non-corridor light intensity if the light associated with the sensor is not within a corridor and the sensed change of light per unit of time is greater than the sense threshold.

6. The system of claim 5, wherein the preselected corridor light intensity is greater than the preselected non-corridor light intensity.

7. The system of claim 5, further comprising the controller only activating the light if within a predetermined amount of time before the sensor sensing a change of light intensity per unit of time greater than a sense threshold, a level light intensity sensed by the sensor is below an initial threshold.

8. A lighting apparatus, comprising:
   a light;
   a sensor associated with the light for sensing a change of light intensity per unit of time greater than a sense threshold;
   a controller, the controller operative to determine if the light is within a corridor, the controller further operative to activate the light at a preselected corridor light intensity if a light associated with the sensor is within a corridor and the sensed change of light intensity per unit of time is greater than the sense threshold, and the controller operative to activate the light at a preselected non-corridor light intensity if the light associated with the sensor is not within a corridor and the sensed change of light per unit of time is greater than the sense threshold.

9. The apparatus of claim 8, wherein the preselected corridor light intensity is greater than the preselected non-corridor light intensity.

10. The apparatus of claim 8, further comprising the controller only activating the light if within a predetermined amount of time before the sensor sensing a change of light intensity per unit of time greater than a sense threshold, a level light intensity sensed by the sensor is below an initial threshold.

* * * * *